(12) United States Patent
Noborisato et al.

(10) Patent No.: US 12,172,124 B2
(45) Date of Patent: Dec. 24, 2024

(54) CARBON DIOXIDE RECOVERY SYSTEM AND CARBON DIOXIDE RECOVERY METHOD

(71) Applicant: MITSUBISHI HEAVY INDUSTRIES, LTD., Tokyo (JP)

(72) Inventors: Tomoki Noborisato, Kanagawa (JP); Takashi Kamijo, Kanagawa (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 399 days.

(21) Appl. No.: 17/633,413

(22) PCT Filed: Aug. 3, 2020

(86) PCT No.: PCT/JP2020/029712
§ 371 (c)(1),
(2) Date: Feb. 7, 2022

(87) PCT Pub. No.: WO2021/084830
PCT Pub. Date: May 6, 2021

(65) Prior Publication Data
US 2022/0288527 A1    Sep. 15, 2022

(30) Foreign Application Priority Data
Oct. 30, 2019  (JP) .................... 2019-196885

(51) Int. Cl.
*B01D 53/14* (2006.01)
*B01D 53/18* (2006.01)
(Continued)

(52) U.S. Cl.
CPC ..... *B01D 53/1425* (2013.01); *B01D 53/1412* (2013.01); *B01D 53/1418* (2013.01);
(Continued)

(58) Field of Classification Search
CPC ............ B01D 53/1425; B01D 53/1412; B01D 53/1418; B01D 53/1475; B01D 53/185
See application file for complete search history.

(56) References Cited

U.S. PATENT DOCUMENTS

| 4,435,371 A | 3/1984 | Frech et al. |
| 2009/0252659 A1 | 10/2009 | Iijima et al. |

(Continued)

FOREIGN PATENT DOCUMENTS

| JP | S52-124470 A | 10/1977 |
| JP | S54-129214 A | 10/1979 |

(Continued)

OTHER PUBLICATIONS

The Office Action dated Sep. 6, 2022, issued in counterpart RU application No. 2022111057 (7 pages).
(Continued)

*Primary Examiner* — Robert A Hopkins
(74) *Attorney, Agent, or Firm* — Osha Bergman Watanabe & Burton LLP (57) ABSTRACT

A carbon dioxide recovery system includes: a plurality of absorption towers each disposed for each of a plurality of combustion equipments for absorbing carbon dioxide in an exhaust gas discharged from each of the plurality of combustion equipments into an absorption liquid by bringing the exhaust gas into contact with the absorption liquid; and at least one regeneration tower communicating with each of the plurality of absorption towers, for recovering carbon dioxide from a $CO_2$ rich absorption liquid which is the absorption liquid flowing out of each of the plurality of absorption towers. The regeneration tower is smaller in number than the absorption towers.

4 Claims, 4 Drawing Sheets

(51) Int. Cl.
*C01B 32/50* (2017.01)
*F23J 15/04* (2006.01)

(52) U.S. Cl.
CPC ....... *B01D 53/1475* (2013.01); *B01D 53/185* (2013.01); *C01B 32/50* (2017.08); *F23J 15/04* (2013.01); *F23J 2900/15027* (2013.01)

(56) References Cited

U.S. PATENT DOCUMENTS

| | | | |
|---|---|---|---|
| 2011/0139003 | A1 | 6/2011 | Joh et al. |
| 2012/0279393 | A1 | 11/2012 | Menzel et al. |
| 2014/0086811 | A1 | 3/2014 | Saito et al. |
| 2018/0257021 | A1 | 9/2018 | Miyamoto et al. |
| 2021/0356128 | A1 | 11/2021 | Tanaka et al. |

FOREIGN PATENT DOCUMENTS

| | | | |
|---|---|---|---|
| JP | S58-156324 A | | 9/1983 |
| JP | S63-208625 A | | 8/1988 |
| JP | H05-31325 A | | 2/1993 |
| JP | H10-28837 A | | 2/1998 |
| JP | H10-165761 A | | 6/1998 |
| JP | 2006-150298 A | | 6/2006 |
| JP | 2009-214089 A | | 9/2009 |
| JP | 2009-248081 A | | 10/2009 |
| JP | 2010-241649 A | | 10/2010 |
| JP | 2011137574 A | * | 7/2011 |
| JP | 2013-516304 A | | 5/2013 |
| JP | 2015-196698 A | | 11/2015 |
| JP | 2016-533886 A | | 11/2016 |
| JP | 2018-187536 A | | 11/2018 |
| JP | 2019-103973 A | | 6/2019 |
| KR | 101812576 B1 | * | 1/2018 |
| RU | 2508158 C2 | | 2/2014 |
| WO | 2015-031484 A1 | | 3/2015 |
| WO | 2019/162992 A1 | | 8/2019 |

OTHER PUBLICATIONS

The Office Action dated Mar. 28, 2023, issued in counterpart JP application No. 2019-196885 (8 pages).
The extended European Search Report issued in corresponding European Application No. 20883190.9, dated Aug. 31, 2022 (12 pages).
Stefania Moioli et al.; "Design of a CO2 Removal Section Treating Very High Flue Gas Flowrates"; Chemical engineering transactions, vol. 74; May 1, 2019; pp. 859-864, XP55953250 (6 pages).
Yu Hai et al.; "Development an Aqueous Ammonia Based PCC Technology for Australian Conditions, Process modelling of combined SO2 and CO2 capture using aqueous ammonia"; Sep. 30, 2015; pp. 1-56, XP055953260 (56 pages).
Nittaya Thanita et al.; "Dynamic modelling and control of MEA absorption processes for CO2 capture from power plants"; Fuel, IPC Sience and Technology Press, Guildford, GB, vol. 116, Sep. 5, 2013; pp. 672-691, XP028770783 (20 pages).
Ana-Maria Cormos et al.; "Process Control Strategy of Amine-Based Post-Combustion CO2 Capture Systems"; Chemical Engineering Transactions, vol. 76; Oct. 1, 2019, May 1, 2019; pp. 1-6; XP055953261 (6 pages).
Hailong Ii et al.; "Impacts of exhaust gas recirculation (EGR) on the natural gas combined cycle integrated with chemical absorption CO2 capture technology"; Energy Procedia, vol. 4; Feb. 6, 2011; pp. 1411-1418; XP028213061 (8 pages).
Kang Guodong et al.; "Removal of high concentration CO2 from natural gas using high pressure membrane contactors"; International Journal of Greenhouse Gas Control, vol. 60, May 1, 2017; pp. 1-9; XP055953252 (9 pages).
Faiz Rami et al.; "CO2 removal from natural gas at high pressure using membrane contactors: Model validation and membrane parametric studies"; Journal of Mambrane Science, Elsevier BV, NL, vol. 365, No. 1-2; Dec. 1, 2010; pp. 232-241; XP027452887 (10 pages).
International Search Report of PCT/JP2020/029712, dated Sep. 24, 2020 (10 pages).
International Preliminary Report on Patentability mailed on May 12, 2022, in corresponding International (PCT) Application No. PCT/JP2020/029712 (13 pages).

* cited by examiner

CARBON DIOXIDE RECOVERY SYSTEM AND CARBON DIOXIDE RECOVERY METHOD

TECHNICAL FIELD

The present disclosure relates to a carbon dioxide recovery system and a carbon dioxide recovery method.

BACKGROUND

A factory, such as a petroleum refining factory or a petrochemical factory, has a combustion equipment on its premises. Since an exhaust gas containing carbon dioxide is discharged from the combustion equipment, an equipment for recovering carbon dioxide from the exhaust gas is provided. As described in Patent Document 1, such a device includes an absorption tower for absorbing carbon dioxide in the exhaust gas into an absorption liquid by bringing the exhaust gas and the absorption liquid into contact with each other, and a regeneration tower for recovering carbon dioxide by separating carbon dioxide from the absorption liquid that has absorbed carbon dioxide.

CITATION LIST

Patent Literature

Patent Document 1: JP2009-214089A

SUMMARY

Technical Problem

If a plurality of combustion equipments are scattered over a wide area on factory premises, it is necessary to provide an absorption tower and a regeneration tower for each combustion equipment. Then, a cost of installing a device for recovering carbon dioxide from an exhaust gas increases, causing a problem that introduction of such device does not proceed. To cope therewith, a method of providing one absorption tower and one regeneration tower in the factory, connecting each combustion equipment and the absorption tower with a duct, and collectively treating the exhaust gas from each combustion equipment may be considered. However, depending on the specifications and scale of the combustion equipment, the outer diameter of the duct may reach several meters, and in such a case, it is difficult to arrange the duct, which may often make such method unrealistic.

In view of the above, an object of at least one embodiment of the present disclosure is to provide a carbon dioxide recovery system capable of reducing an installation cost and a carbon dioxide recovery method capable of reducing a carbon dioxide recovery cost.

Solution to Problem

In order to achieve the above object, a carbon dioxide recovery system according to the present disclosure includes a plurality of absorption towers for absorbing carbon dioxide in an exhaust gas discharged from each of a plurality of combustion equipments into an absorption liquid by bringing the exhaust gas into contact with the absorption liquid, and at least one regeneration tower communicating with each of the plurality of absorption towers, for recovering carbon dioxide from a $CO_2$ rich absorption liquid which is the absorption liquid flowing out of each of the plurality of absorption towers. The regeneration tower is smaller in number than the absorption towers.

Further, a carbon dioxide recovery method according to the present disclosure includes a step of absorbing carbon dioxide in an exhaust gas discharged from each of a plurality of combustion equipments into an absorption liquid by individually bringing the exhaust gas into contact with the absorption liquid, and a step of recovering carbon dioxide from $CO_2$ rich absorption liquids each of which is the absorption liquid absorbing carbon dioxide.

Advantageous Effects

According to a carbon dioxide recovery system and a carbon dioxide recovery method of the present disclosure, since only one regeneration tower or regeneration towers smaller in number than absorption towers are provided for recovering carbon dioxide from $CO_2$ rich absorption liquid that has absorbed carbon dioxide in an exhaust gas discharged from each of a plurality of combustion equipments, compared with a case where the absorption tower and the regeneration tower are provided for each of the plurality of combustion equipments, it is possible to reduce an installation cost of the carbon dioxide recovery system and a carbon dioxide recovery cost.

DETAILED DESCRIPTION

Detailed Description

Hereinafter, a carbon dioxide recovery system and a carbon dioxide recovery method according to embodiments of the present disclosure will be described with reference to the drawings. The embodiments each indicate one aspect of the present disclosure, do not intend to limit the disclosure, and can optionally be modified within a range of a technical idea of the present disclosure.

Embodiment 1

Configuration of Carbon Dioxide Recovery System According to Embodiment 1

Figure 1:
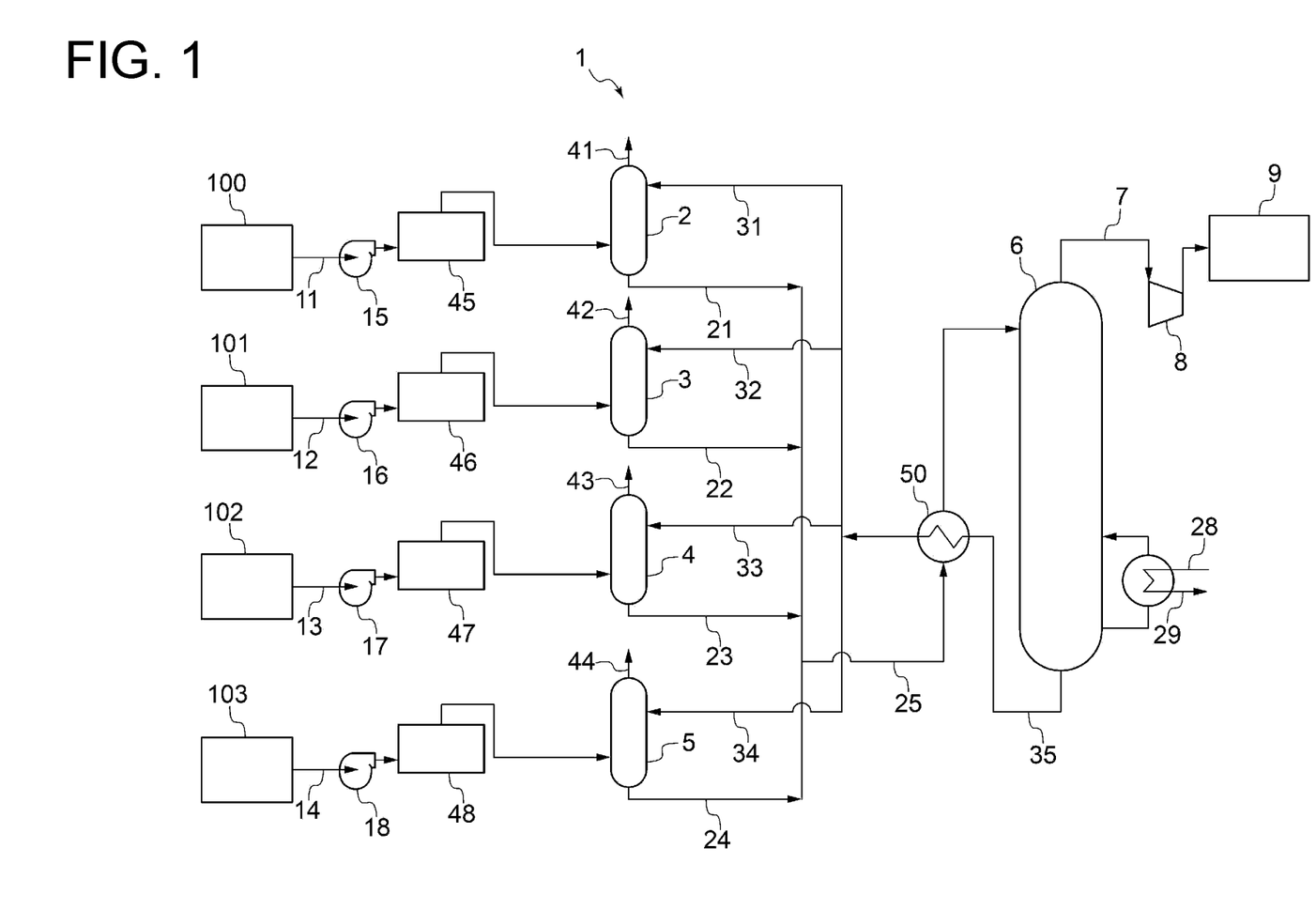
FIG. 1 is a configuration diagram of a carbon dioxide recovery system according to Embodiment 1 of the present disclosure.

As shown in FIG. 1, a carbon dioxide recovery system 1 according to Embodiment 1 of the present disclosure includes a plurality of absorption towers 2, 3, 4, 5 for absorbing, into an absorption liquid, carbon dioxide in exhaust gases respectively discharged from a plurality of combustion equipments, for example, a furnace 100 such as a heating furnace, a reforming furnace, or a reactor, a boiler 101, a steam reformer 102, and a gas turbine 103 provided on factory premises by bringing the exhaust gases into contact with the absorption liquid, and one regeneration tower 6 communicating with each of the absorption towers 2, 3, 4, 5.

The furnace 100, the boiler 101, the steam reformer 102, and the gas turbine 103, and the absorption towers 2, 3, 4, 5 are connected via ducts 11, 12, 13, 14, respectively. The ducts 11, 12, 13, 14 are provided with blowers 15, 16, 17, 18 and quenchers 45, 46, 47, 48, respectively. The blowers 15, 16, 17, 18 are not limited to being installed upstream of the quenchers 45, 46, 47, 48, respectively (configuration in FIG. 1), but may be installed downstream thereof.

The absorption towers 2, 3, 4, 5 are, respectively, provided with outflow pipes 21, 22, 23, 24 where $CO_2$ rich absorption liquids flow which are the absorption liquids flowing out of the absorption towers 2, 3, 4, 5, respectively. The outflow pipes 21, 22, 23, 24 communicate with the regeneration tower 6 via an inflow pipe 25 for merging the $CO_2$ rich absorption liquids respectively flowing through the outflow pipes to be flowed into the regeneration tower 6. Then, between the merging point of the inflow pipe 25 and the inflow point to the regeneration tower 6, a rich-lean solution heat exchanger 50 is disposed for causing the $CO_2$ rich absorption liquid of the inflow pipe 25 and a $CO_2$ lean absorption liquid of an outflow pipe 35 to be described later to exchange heat. Instead of providing the inflow pipe 25, it may be configured such that each $CO_2$ rich absorption liquid flowing through a corresponding one of the outflow pipes directly flows into the regeneration tower 6. In that case, a rich-lean solution heat exchanger is disposed for causing the respective $CO_2$ rich absorption liquids of the outflow pipes 21, 22, 23, 24 and respective $CO_2$ lean absorption liquids of $CO_2$ lean absorption liquid supply pipes 31, 32, 33, 34 to be described later to exchange heat.

The absorption towers 2, 3, 4, 5 are provided with the $CO_2$ lean absorption liquid supply pipes 31, 32, 33, 34 to which the absorption liquids brought into contact with the exhaust gases from the combustion equipments are supplied, respectively. Each of the $CO_2$ lean absorption liquid supply pipes 31, 32, 33, 34 communicates with the regeneration tower 6 via the outflow pipe 35 for the $CO_2$ lean absorption liquid, which is obtained by removing carbon dioxide from the $CO_2$ rich absorption liquid in the regeneration tower 6 by an operation to be described later, to flow out of the regeneration tower 6.

The absorption towers 2, 3, 4, 5 are provided with exhaust gas outflow pipes 41, 42, 43, 44 for causing the exhaust gases having contacted the absorption liquids to flow out of the absorption towers 2, 3, 4, 5, respectively. The regeneration tower 6 communicates with a carbon dioxide using device 9 for using carbon dioxide recovered from the $CO_2$ rich absorption liquids via a carbon dioxide line 7. The carbon dioxide line 7 is provided with a compressor 8 for boosting carbon dioxide. Further, the regeneration tower 6 is provided with a heat exchanger (reboiler) including a heat medium flow passage (not shown) through which a heat medium, such as water vapor, for heating the $CO_2$ rich absorption liquids flows. The heat exchanger is connected to a heat medium supply line 28 for supplying water vapor and a heat medium discharge line 29 for condensed water to flow out of the heat exchanger.

Operation of Carbon Dioxide Recovery System According to Embodiment 1

Next, the operation of the carbon dioxide recovery system 1 according to Embodiment 1 of the present disclosure will be described. As shown in FIG. 1, the exhaust gases respectively discharged from the furnace 100, the boiler 101, the steam reformer 102, and the gas turbine 103 flow through the ducts 11, 12, 13, 14 by the blowers 15, 16, 17, 18, respectively, are cooled by the quenchers 45, 46, 47, 48, respectively, and flow into the absorption towers 2, 3, 4, 5, respectively. The exhaust gases respectively flowing into the absorption towers 2, 3, 4, 5 are brought into contact with the absorption liquids flowing into the absorption towers 2, 3, 4, 5 via the $CO_2$ lean absorption liquid supply pipes 31, 32, 33, 34, respectively, thereby absorbing at least a part of carbon dioxide contained in the exhaust gases into the absorption liquids. The absorption liquids absorbing carbon dioxide flow out of the absorption towers 2, 3, 4, 5 as the $CO_2$ rich absorption liquids, and flow through the outflow pipes 21, 22, 23, 24, respectively.

The $CO_2$ rich absorption liquids respectively flowing through the outflow pipes 21, 22, 23, 24 are merged by flowing into the inflow pipe 25 and flow into the regeneration tower 6. In the regeneration tower 6, the $CO_2$ rich absorption liquids release carbon dioxide therefrom by being heated by water vapor, which is the heat medium supplied to the heat exchanger of the regeneration tower 6 via the heat medium supply line 28, and become the $CO_2$ lean absorption liquids. The water vapor heating the $CO_2$ rich absorption liquids flows out, as condensed water, of the heat exchanger of the regeneration tower 6 via the heat medium discharge line 29.

The carbon dioxide released from the $CO_2$ rich absorption liquids in the regeneration tower 6 flows out of the regeneration tower 6, is caused to flow through the carbon dioxide line 7 by the compressor 8, and is supplied to the carbon dioxide using device 9 for using carbon dioxide. The regeneration tower 6 thus recovers carbon dioxide from the $CO_2$ rich absorption liquids. On the other hand, the $CO_2$ lean absorption liquids flow out of the regeneration tower 6 as the absorption liquids supplied to the absorption towers 2, 3, 4, 5, respectively, and flow through the outflow pipe 35. The $CO_2$ lean absorption liquids flowing through the outflow pipe 35 are distributed to the $CO_2$ lean absorption liquid supply pipes 31, 32, 33, 34, respectively, and supplied to the absorption towers 2, 3, 4, 5, respectively.

Technical Effect of Carbon Dioxide Recovery System According to Embodiment 1

With the carbon dioxide recovery system 1 according to Embodiment 1 of the present disclosure, since provided are the only one regeneration tower 6 for recovering carbon dioxide from the $CO_2$ rich absorption liquids that have absorbed carbon dioxide in the exhaust gases respectively discharged from the plurality of combustion equipments, that is, the furnace 100, the boiler 101, the steam reformer 102, and the gas turbine 103, and the only one rich-lean solution heat exchanger 50, compared with a case where an absorption tower and a regeneration tower are provided for each combustion equipment, it is possible to reduce an installation cost of the carbon dioxide recovery system 1. In Embodiment 1, the only one regeneration tower 6 and the only one rich-lean solution heat exchanger 50 are provided. However, even if a plurality of regeneration towers 6 and a plurality of rich-lean solution heat exchangers 50 are provided, as long as the number of regeneration towers 6 and rich-lean solution heat exchangers 50 is smaller than the number of absorption towers, compared with the case where the absorption tower and the regeneration tower are provided for each combustion equipment, it is possible to reduce the installation cost of the carbon dioxide recovery system 1.

Figure 2:
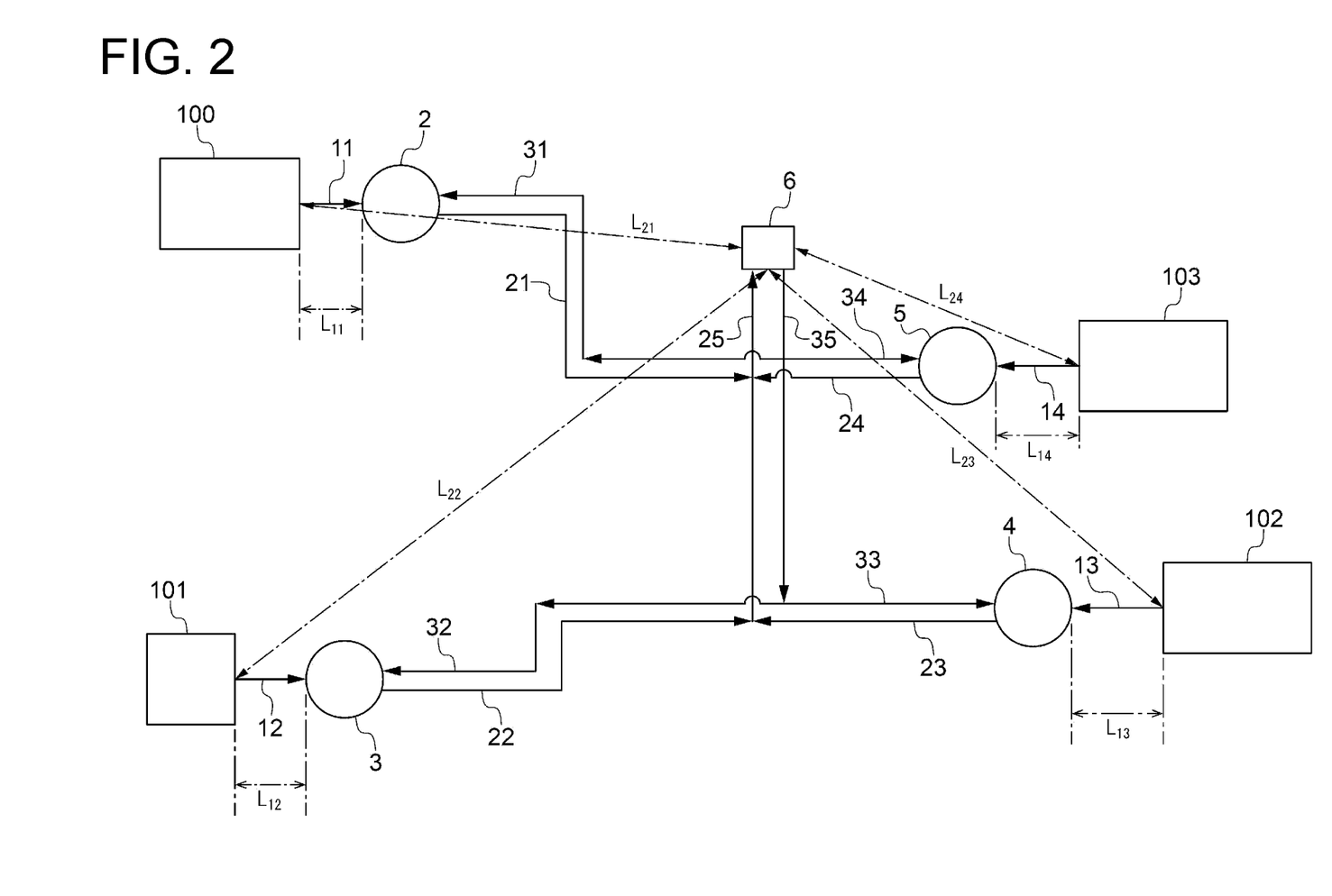
FIG. 2 is a layout diagram of the carbon dioxide recovery system according to Embodiment 1 of the present disclosure.

As shown in FIG. 2, even if the plurality of combustion equipments, that is, the furnace 100, the boiler 101, the steam reformer 102, and the gas turbine 103 are scattered over a wide area in the factory premises, it is possible to dispose the absorption tower 2, 3, 4, 5 provided for each of the combustion equipments near the combustion equipment. Disposing the absorption tower 2, 3, 4, 5 provided for each of the combustion equipments near the combustion equipment, a distance $L_{11}$, $L_{12}$, $L_{13}$, $L_{24}$ between each of the furnace 100, the boiler 101, the steam reformer 102, and the gas turbine 103, and a corresponding one of the absorption towers 2, 3, 4, 5 is shorter than a distance $L_{21}$, $L_{22}$, $L_{23}$, $L_{24}$ between the regeneration tower 6 and each of the furnace 100, the boiler 101, the steam reformer 102, and the gas turbine 103.

The outer diameters of the ducts 11, 12, 13, 14 connecting the combustion equipments and the absorption towers 2, 3, 4, 5 tend to significantly be larger than the outer diameter of the piping connecting the absorption towers 2, 3, 4, 5 and the regeneration tower 6, that is, the outflow pipes 21, 22, 23, 24 and the inflow pipe 25. However, disposing the absorption towers 2, 3, 4, 5 near the combustion equipments and arranging only the piping connecting the absorption towers 2, 3, 4, 5 and the regeneration tower 6, it is possible to shorten the ducts 11, 12, 13, 14 each having the large outer diameter and to reduce arrangement of the ducts. Thus, the carbon dioxide recovery system 1 is installed easily.

Modified Example of Carbon Dioxide Recovery System According to Embodiment 1

Embodiment 1 exemplifies the four equipments, namely, the furnace 100, the boiler 101, the steam reformer 102, and the gas turbine 103 as the plurality of combustion equipments. However, the combustion equipments are not limited thereto, but may be any equipment for discharging an exhaust gas containing carbon dioxide due to combustion. Further, the number of combustion equipments is not limited to four, but may be two or three, or not less than five.

Figure 3:
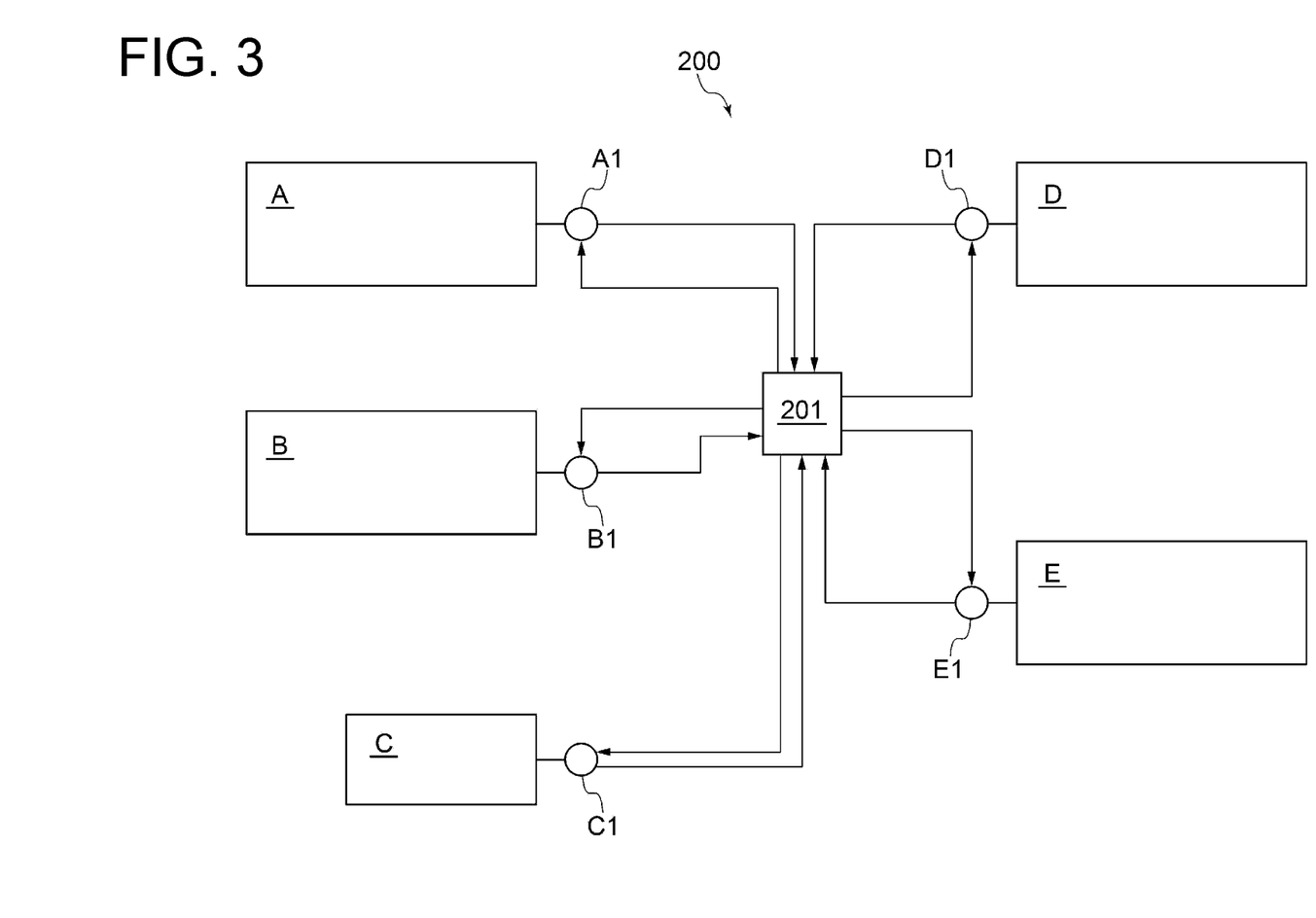
FIG. 3 is a layout diagram showing a modified example of the carbon dioxide recovery system according to Embodiment 1 of the present disclosure.

Further, in Embodiment 1, each combustion equipment is installed on the same factory premises. However, the present disclosure is not limited to this form. For example, as shown in FIG. 3, in a complex where a plurality of plants A, B, C, D, E are adjacent to each other, it is also possible to install a carbon dioxide recovery system 200 where absorption towers A1, B1, C1, D1, E1 for absorbing carbon dioxide in exhaust gases discharged from the respective plants into absorption liquids by bringing the exhaust gases into contact with the absorption liquids are disposed near the plants, respectively, and one regeneration tower 201 connected to each of the absorption towers A1 to E1 is provided.

Unlike the carbon dioxide recovery system 1 according to Embodiment 1, the carbon dioxide recovery system 200 does not recover carbon dioxide from the exhaust gases from the plurality of combustion equipments provided in one factory, but recovers carbon dioxide from the exhaust gases discharged from the complex where the plurality of plants are adjacent to each other. Thus, treating the exhaust gases from the plurality of plants of different companies, it is possible to further suppress an increase in installation cost of the carbon dioxide recovery system. In particular, by doing so, even a company without resources to install the carbon dioxide recovery system can treat the exhaust gases discharged from the combustion equipments at low cost.

Embodiment 2

Next, the carbon dioxide recovery system according to Embodiment 2 will be described. The carbon dioxide recovery system according to Embodiment 2 is obtained by adding, to Embodiment 1, a configuration for optimizing a carbon dioxide recovery operation. In Embodiment 2, the same constituent elements as those in Embodiment 1 are associated with the same reference characters and not described again in detail.

Configuration of Carbon Dioxide Recovery System According to Embodiment 2

Figure 4:
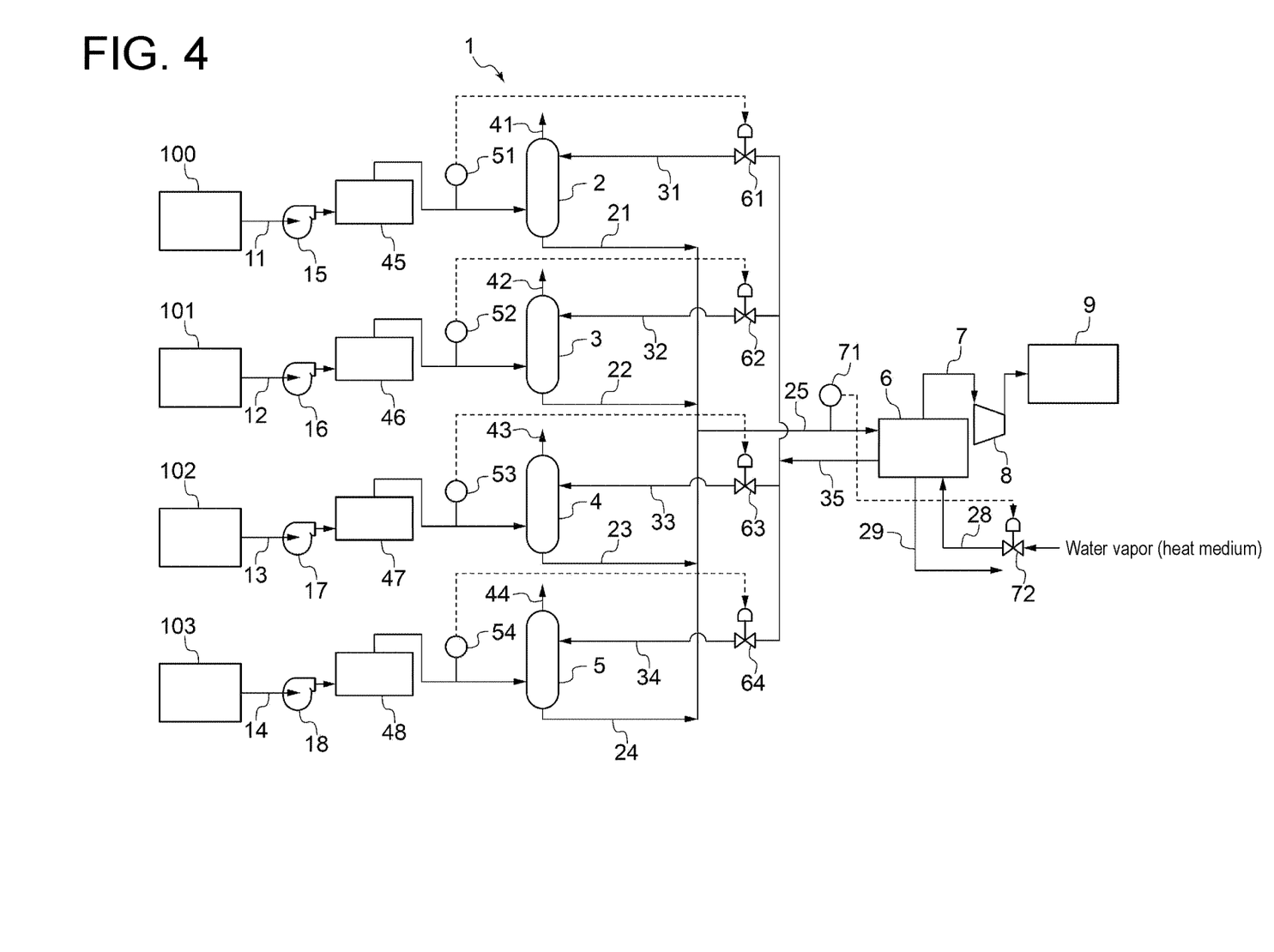
FIG. 4 is a configuration diagram of a carbon dioxide recovery system according to Embodiment 2 of the present disclosure.

As shown in FIG. 4, in the carbon dioxide recovery system 1 according to Embodiment 2 of the present disclosure, the ducts 11, 12, 13, 14 are, respectively, provided with carbon dioxide flow rate acquisition parts 51, 52, 53, 54 for acquiring the flow rate of carbon dioxide contained in the exhaust gases between the quenchers 45, 46, 47, 48 and the absorption towers 2, 3, 4, 5. The carbon dioxide flow rate acquisition parts 51, 52, 53, 54 can each be constituted by a flow rate sensor for detecting the flow rate of the exhaust gas and a concentration sensor for detecting the concentration of carbon dioxide in the exhaust gas. Multiplying values detected by the both sensors, it is possible to detect the flow rate of carbon dioxide flowing into each of the absorption towers 2, 3, 4, 5. If the blowers 15, 16, 17, 18 are, respectively, installed downstream of the quenchers 45, 46, 47, 48, the carbon dioxide flow rate acquisition parts 51, 52, 53, 54 may be disposed between the blower 15, 16, 17, 18 and the absorption towers 2, 3, 4, 5, respectively.

The $CO_2$ lean absorption liquid supply pipes 31, 32, 33, 34 are, respectively, provided with flow control valves 61, 62, 63, 64 which are flow control parts for controlling the flow rates of the $CO_2$ lean absorption liquids flowing through the $CO_2$ lean absorption liquid supply pipes 31, 32, 33, 34, respectively. The flow control valves 61, 62, 63, 64 and the carbon dioxide flow rate acquisition parts 51, 52, 53, 54 are, respectively, electrically connected to each other.

The inflow pipe 25 is provided with a carbon dioxide flow rate acquisition part 71 for acquiring the flow rate of carbon dioxide absorbed into the $CO_2$ rich absorption liquid. The carbon dioxide flow rate acquisition part 71 can be constituted by a flow rate sensor for detecting the flow rate of the $CO_2$ rich absorption liquid flowing through the inflow pipe 25, that is, flowing into the regeneration tower 6, and a concentration sensor for detecting the concentration of carbon dioxide absorbed into the $CO_2$ rich absorption liquid. Multiplying values detected by the both sensors, it is possible to detect the flow rate of carbon dioxide flowing into the regeneration tower 6. The heat medium supply line 28 is provided with a flow control valve 72 which is a heat medium flow control part for controlling the flow rate of water vapor supplied to the heat exchanger of the regeneration tower 6. The flow control valve 72 and the carbon dioxide flow rate acquisition part 71 are electrically connected to each other. Other configurations are the same as Embodiment 1.

Operation of Carbon Dioxide Recovery System According to Embodiment 2

Next, the operation of the carbon dioxide recovery system 1 according to Embodiment 2 of the present disclosure will be described. As shown in FIG. 4, as with Embodiment 1, the exhaust gases respectively discharged from the furnace 100, the boiler 101, the steam reformer 102, and the gas turbine 103 flow into the absorption towers 2, 3, 4, 5 via the ducts 11, 12, 13, 14, respectively. In Embodiment 2, before the respective exhaust gases flow into the absorption towers 2, 3, 4, 5, the carbon dioxide flow rate acquisition parts 51, 52, 53, 54 detect the flow rate of carbon dioxide contained in the exhaust gases, respectively. Thereafter, the operation in which carbon dioxide in the exhaust gas is absorbed into the absorption liquid in each absorption tower 2, 3, 4, 5, carbon dioxide is recovered from the absorption liquid that has absorbed carbon dioxide ($CO_2$ rich absorption liquid) in the regeneration tower 6, and the absorption liquid from which carbon oxide is recovered ($CO_2$ lean absorption liquid) is supplied to each absorption tower 2, 3, 4, 5 again is the same as Embodiment 1.

The amount of carbon dioxide that can be absorbed into the absorption liquid in each absorption tower 2, 3, 4, 5 can be estimated from the flow rate of inflowing carbon dioxide and the flow rate of a component capable of absorbing carbon dioxide of, for example, monoethanolamine contained in the absorption liquid. Thus, it is possible to estimate the concentration of carbon dioxide in the $CO_2$ rich absorption liquids flowing out of the absorption towers 2, 3, 4, 5, respectively. Thus, a correlation between the flow rate of carbon dioxide flowing into each absorption tower 2, 3, 4, 5 and the flow rate of an absorption component in the absorption liquid supplied to each absorption tower 2, 3, 4, 5 can be determined in advance in the form of a map, a relational expression, or the like such that the carbon dioxide concentration in the $CO_2$ rich absorption liquid flowing out of each absorption tower 2, 3, 4, 5 is not less than a preset lower limit concentration, for example, 0.3 (mol/mol-absorption component). The flow rate of the absorption component can be calculated by multiplying the flow rate of the absorption liquid by the concentration of the absorption component in the absorption liquid, if only the concentration of the absorption component is determined.

Based on the correlation (such as the map or the relational expression) between the flow rate of carbon dioxide and the flow rate of the absorption component described above, the flow control valves 61, 62, 63, 64 control, from the values respectively detected by the carbon dioxide flow rate acquisition parts 51, 52, 53, 54, the flow rates of the absorption liquids supplied to the absorption towers 2, 3, 4, 5, respectively. Thus, it is possible to set the concentration of carbon dioxide in the $CO_2$ rich absorption liquid flowing out of each absorption tower 2, 3, 4, 5 at not less than the preset lower limit concentration.

If the concentration of carbon dioxide in the $CO_2$ rich absorption liquid is too low, the carbon dioxide recovery rate in the regeneration tower 6 decreases. However, in Embodiment 2, the carbon dioxide concentration in the $CO_2$ rich absorption liquid flowing out of each absorption tower 2, 3, 4, 5 is not less than the preset lower limit concentration, and as a result, the concentration of carbon dioxide in the $CO_2$ rich absorption liquid can be maintained high to some extent. Thus, it is possible to suppress a decrease in carbon dioxide recovery rate in the regeneration tower 6.

In Embodiment 2, the operation of recovering carbon dioxide in the regeneration tower 6 is the same as Embodiment 1. However, in Embodiment 2, when the $CO_2$ rich absorption liquid flows through the inflow pipe 25 before flowing into the regeneration tower 6, the carbon dioxide flow rate acquisition part 71 detects the flow rate of carbon dioxide absorbed into the $CO_2$ rich absorption liquid. If the flow rate of carbon dioxide flowing into the regeneration tower 6 is high, it is necessary to further increase a heat quantity given to the $CO_2$ rich absorption liquid in the regeneration tower 6. In other words, it is necessary to increase the amount of water vapor supplied to the heat exchanger of the regeneration tower 6. That is, since there is the correlation between the flow rate of carbon dioxide flowing into the regeneration tower 6 and the flow rate of water vapor supplied to the heat exchanger of the regeneration tower 6, by determining such correlation in the form of the map, the relational expression, or the like in advance, based on such correlation (the map, the relational expression, or the like), the flow control valve 72 can control the amount of water vapor supplied to a jacket of the regeneration tower 6 from the value detected by the carbon dioxide flow rate acquisition part 71. Thus, water vapor can be supplied to the heat exchanger of the regeneration tower 6 at the flow rate required for recovery of carbon dioxide in the regeneration tower 6, making it possible to optimize the usage of water vapor.

The contents described in the above embodiments would be understood as follows, for instance.

(1) A carbon dioxide recovery system according to one aspect includes a plurality of absorption towers (2, 3, 4, 5) for absorbing carbon dioxide in an exhaust gas discharged from each of a plurality of combustion equipments (furnace 100, boiler 101, steam reformer 102, gas turbine 103) into an absorption liquid by bringing the exhaust gas into contact with the absorption liquid, and at least one regeneration tower (6) communicating with each of the plurality of absorption towers (2, 3, 4, 5), for recovering carbon dioxide from a $CO_2$ rich absorption liquid which is the absorption liquid flowing out of each of the plurality of absorption towers (2, 3, 4, 5). The regeneration tower (6) is smaller in number than the absorption towers (2, 3, 4, 5).

With the carbon dioxide recovery system of the present disclosure, since the only one regeneration tower or the regeneration towers smaller in number than the absorption towers are provided for recovering carbon dioxide from the $CO_2$ rich absorption liquids that have absorbed carbon dioxide in the exhaust gases respectively discharged from the plurality of combustion equipments, compared with a case where an absorption tower and a regeneration tower are provided for each of the plurality of combustion equipments, it is possible to reduce an installation cost of the carbon dioxide recovery system.

(2) The carbon dioxide recovery system according to another aspect is the carbon dioxide recovery system according to the above configuration (1), where the plurality of combustion equipments (100, 101, 102, 103) and the plurality of absorption towers (2, 3, 4, 5) are connected by ducts (11, 12, 13, 14), respectively.

With the above configuration, even if the plurality of combustion equipments are scattered over a wide area, it is possible to dispose the absorption tower provided for each of the combustion equipments near the combustion equipment. The outer diameters of the ducts connecting the combustion equipments and the absorption towers tend to significantly be larger than the outer diameter of the piping connecting the absorption towers and the regeneration tower. However, disposing the absorption towers near the combustion equipments and arranging only the piping connecting the absorption towers and the regeneration tower, it is possible to shorten the ducts each having the large outer diameter and to reduce arrangement of the ducts. Thus, the carbon dioxide recovery system is installed easily.

(3) The carbon dioxide recovery system according to still another aspect is the carbon dioxide recovery system according to the above configuration (1) or (2), where a distance ($L_{11}$, $L_{12}$, $L_{13}$, $L_{14}$) between each of the plurality of combustion equipments (100, 101, 102, 103) and a corresponding one of the plurality of absorption towers (2, 3, 4, 5) provided for each of the plurality of combustion equipments (100, 101, 102, 103) is smaller than a distance ($L_{21}$, $L_{22}$, $L_{23}$, $L_{24}$) between each of the plurality of combustion equipments (100, 101, 102, 103) and the regeneration tower (6).

With the above configuration, only the piping connecting the absorption towers and the regeneration tower is arranged by disposing the absorption towers near the combustion equipments, making it possible to shorten the ducts each having the large outer diameter and to reduce arrangement of the ducts. Thus, the carbon dioxide recovery system is installed easily.

(4) The carbon dioxide recovery system according to yet another aspect is the carbon dioxide recovery system according to any one of the above configurations (1) to (3), including a plurality of $CO_2$ lean absorption liquid supply pipes (31, 32, 33, 34) for supplying, to each of the plurality of absorption towers (2, 3, 4, 5), a $CO_2$ lean absorption liquid, which is obtained by removing carbon dioxide from the $CO_2$ rich absorption liquid by the regeneration tower (6), as the absorption liquid contacting the exhaust gas in each of the plurality of absorption towers, and a flow control part (flow control valve 61, 62, 63, 64) for controlling a flow rate of the $CO_2$ lean absorption liquid flowing through each of the plurality of $CO_2$ lean absorption liquid supply pipes (31, 32, 33, 34). The flow control part (61, 62, 63, 64) controls the flow rate of the $CO_2$ lean absorption liquid flowing through each of the plurality of $CO_2$ lean absorption liquid supply pipes (31, 32, 33, 34) such that a carbon dioxide concentration in the $CO_2$ rich absorption liquid flowing out of each of the plurality of absorption towers (2, 3, 4, 5) is not less than a preset lower limit concentration.

If the concentration of carbon dioxide in the $CO_2$ rich absorption liquid is too low, the carbon dioxide recovery rate in the regeneration tower decreases. However, with the above configuration (4), the carbon dioxide concentration in the $CO_2$ rich absorption liquid flowing out of each of the plurality of absorption towers is not less than the preset lower limit concentration, and as a result, the concentration of carbon dioxide in the $CO_2$ rich absorption liquid can be maintained high to some extent. Thus, it is possible to suppress a decrease in carbon dioxide recovery rate in the regeneration tower.

(5) The carbon dioxide recovery system according to yet another aspect is the carbon dioxide recovery system according to any one of the above configurations (1) to (4), including a carbon dioxide flow rate acquisition part (71) for acquiring a flow rate of carbon dioxide flowing into the regeneration tower (6), and a heat medium flow control part (flow control valve 72) for controlling a flow rate of a heat medium supplied to the regeneration tower (6) in order to heat the $CO_2$ rich absorption liquid in the regeneration tower (6). The heat medium flow control part (72) controls the flow rate of the heat medium based on a value detected by the carbon dioxide flow rate acquisition part.

With the above configuration, since the heat medium can be supplied to the regeneration tower at the flow rate required for recovery of carbon dioxide in the regeneration tower, it is possible to optimize the usage of the heat medium.

(6) A carbon dioxide recovery method according to one aspect includes a step of absorbing carbon dioxide in an exhaust gas discharged from each of a plurality of combustion equipments into an absorption liquid by individually bringing the exhaust gas into contact with the absorption liquid, and a step of recovering carbon dioxide after merging $CO_2$ rich absorption liquids each of which is the absorption liquid absorbing carbon dioxide.

With the carbon dioxide recovery method of the present disclosure, since carbon dioxide is recovered after the $CO_2$ rich absorption liquids are merged which absorb carbon dioxide in the exhaust gases respectively discharged from the plurality of combustion equipments, compared with a case where carbon dioxide is absorbed and recovered for each of the plurality of combustion equipments, it is possible to reduce a carbon dioxide recovery cost.

REFERENCE SIGNS LIST

1 Carbon dioxide recovery system
2 Absorption tower
3 Absorption tower
4 Absorption tower
5 Absorption tower
6 Regeneration tower
11 Duct
12 Duct
13 Duct
14 Duct
31 $CO_2$ lean absorption liquid supply pipe
32 $CO_2$ lean absorption liquid supply pipe
33 $CO_2$ lean absorption liquid supply pipe
34 Absorption liquid supply pipe
61 Flow control valve (flow control part)
62 Flow control valve (flow control part)
63 Flow control valve (flow control part)
64 Flow control valve (flow control part)
71 Carbon dioxide flow rate acquisition part
72 Flow control valve (heat medium flow control part)
100 Furnace
101 Boiler
102 Steam reformer
103 Gas turbine
200 Carbon dioxide recovery system
201 Regeneration tower
A Plant
A1 Absorption tower
B Plant
B1 Absorption tower
C Plant
C1 Absorption tower
D Plant
D1 Absorption tower
E Plant
E1 Absorption tower

The invention claimed is:

1. A carbon dioxide recovery system, comprising:
absorption towers each disposed for each of combustion equipments for absorbing carbon dioxide in an exhaust gas discharged from the each of the combustion equipments into an absorption liquid by bringing the exhaust gas into contact with the absorption liquid;
ducts that each connect the combustion equipments with corresponding ones of the absorption towers;
at least one regeneration tower communicating with each of the absorption towers, for recovering carbon dioxide from a $CO_2$ rich absorption liquid that is the absorption liquid flowing out of each of the absorption towers; and $CO_2$ rich absorption liquid supply pipes that each connect the absorption towers with the at least one regeneration tower and supply the $CO_2$ rich absorption liquid from the absorption towers to the at least one regeneration tower, wherein the regeneration tower is smaller in number than the absorption towers, a distance between each of the combustion equipments and a corresponding one of the absorption towers provided for each of the combustion equipments is shorter than a distance between each of the combustion equipments and the regeneration tower, and outer diameters of the ducts are larger than outer diameters of the $CO_2$ rich absorption liquid supply pipes.

2. The carbon dioxide recovery system according to claim 1, further comprising:

$CO_2$ lean absorption liquid supply pipes for supplying, to each of the absorption towers, a $CO_2$ lean absorption liquid, which is obtained by removing carbon dioxide from the $CO_2$ rich absorption liquid by the regeneration tower, as the absorption liquid contacting the exhaust gas in each of the absorption towers; and a flow control part for controlling a flow rate of the $CO_2$ lean absorption liquid flowing through each of the $CO_2$ lean absorption liquid supply pipes, wherein the flow control part controls the flow rate of the $CO_2$ lean absorption liquid flowing through each of the $CO_2$ lean absorption liquid supply pipes such that a carbon dioxide concentration in the $CO_2$ rich absorption liquid flowing out of each of the absorption towers is not less than a preset lower limit concentration.

3. The carbon dioxide recovery system according to claim 1, further comprising:

a carbon dioxide flow rate acquisition part for acquiring a flow rate of carbon dioxide flowing into the regeneration tower; and a heat medium flow control part for controlling a flow rate of a heat medium supplied to the regeneration tower in order to heat the $CO_2$ rich absorption liquid in the regeneration tower, wherein the heat medium flow control part controls the flow rate of the heat medium based on a value detected by the carbon dioxide flow rate acquisition part.

4. A carbon dioxide recovery method, comprising:

a step of absorbing carbon dioxide in an exhaust gas discharged from each of combustion equipments into an absorption liquid by individually bringing the exhaust gas into contact with the absorption liquid in each of absorption towers provided for combustion equipments, respectively, wherein the exhaust gas discharged from each of the combustion equipments; and a step of recovering carbon dioxide in at least one regeneration tower after merging $CO_2$ rich absorption liquids each of which is the absorption liquid absorbing carbon dioxide, wherein the at least one regeneration tower is smaller in number than the absorption towers, a distance between each of the combustion equipments and a corresponding one of the absorption towers provided for each of the combustion equipments is shorter than a distance between each of the combustion equipments and the at least one regeneration tower, and outer diameters of ducts that each connect the combustion equipments with corresponding ones of the absorption towers are larger than outer diameters of $CO_2$ rich absorption liquid supply pipes that each supply the $CO_2$ rich absorption liquids from the absorption towers to the at least one regeneration tower.

* * * * *